(12) United States Patent
Zhang et al.

(10) Patent No.: US 12,647,233 B2
(45) Date of Patent: Jun. 2, 2026

(54) ADAPTIVE BEAM MANAGEMENT APPROACH FOR NEW RADIO SYSTEMS

(71) Applicant: MEDIATEK INC., Hsin-Chu (TW)

(72) Inventors: Bohan Zhang, San Jose, CA (US); Yabo Li, San Jose, CA (US); Wei-Jen Chen, Hsin-Chu (TW); Tsung-Sheng Tang, Hsin-Chu (TW)

(73) Assignee: MediaTek Inc., Hsinchu City (TW)

( * ) Notice: Subject to any disclaimer, the term of this patent is extended or adjusted under 35 U.S.C. 154(b) by 521 days.

(21) Appl. No.: 18/088,701

(22) Filed: Dec. 26, 2022

(65) Prior Publication Data

US 2023/0216641 A1 Jul. 6, 2023

Related U.S. Application Data

(60) Provisional application No. 63/296,892, filed on Jan. 6, 2022.

(51) Int. Cl.
H04L 5/00 (2006.01)

(52) U.S. Cl.
CPC .......... H04L 5/0051 (2013.01); H04L 5/0023 (2013.01); H04L 5/0035 (2013.01); H04L 5/006 (2013.01)

(58) Field of Classification Search
None
See application file for complete search history.

(56) References Cited

U.S. PATENT DOCUMENTS

| | | | |
|---|---|---|---|
| 2016/0269087 A1 | 9/2016 | Subramanian | H04B 7/06 |
| 2017/0331670 A1* | 11/2017 | Parkvall | H04J 11/0056 |
| 2018/0192313 A1* | 7/2018 | Axmon | H04W 28/0205 |
| 2019/0053234 A1 | 2/2019 | Cui | H04L 5/00 |
| 2019/0296838 A1* | 9/2019 | Hessler | H04L 1/203 |
| 2020/0328780 A1 | 10/2020 | Chen | H04B 7/022 |
| 2021/0136703 A1 | 5/2021 | Kundargi | H04B 7/08 |
| 2021/0176656 A1* | 6/2021 | Sang | H04W 36/302 |
| 2022/0286247 A1* | 9/2022 | Liu | H04L 5/0051 |

OTHER PUBLICATIONS

Taiwan Intellectual Property Office Action 112100328., dated Dec. 25, 2023 (12 pages).

* cited by examiner

*Primary Examiner* — Diane L Lo
(74) *Attorney, Agent, or Firm* — Helen Mao; Zheng Jin; Imperium Patent Works

(57) ABSTRACT

A method to perform beam management (BM) and/or synchronization (Sync) using primary synchronization signal (PSS) when pilot contamination is low to improve system performance is proposed. A UE first determines pilot contamination level on PSS of a synchronization signal block (SSB), depending on different network deployment scenarios. The UE then adaptively perform BM or Sync, by dynamically adjusting to the pilot contamination level on PSS. If the pilot contamination level is high, then the UE follows a 3-symbol mode, e.g., uses only PBCH0, SSS, and PBCH2 symbols for performing BM or Sync. Otherwise, if the pilot contamination level is low, then the UE follows a 4-symbol mode, e.g., uses PSS as an extra symbol for BM or Sync to improve system performance.

24 Claims, 5 Drawing Sheets

(a)

(b)

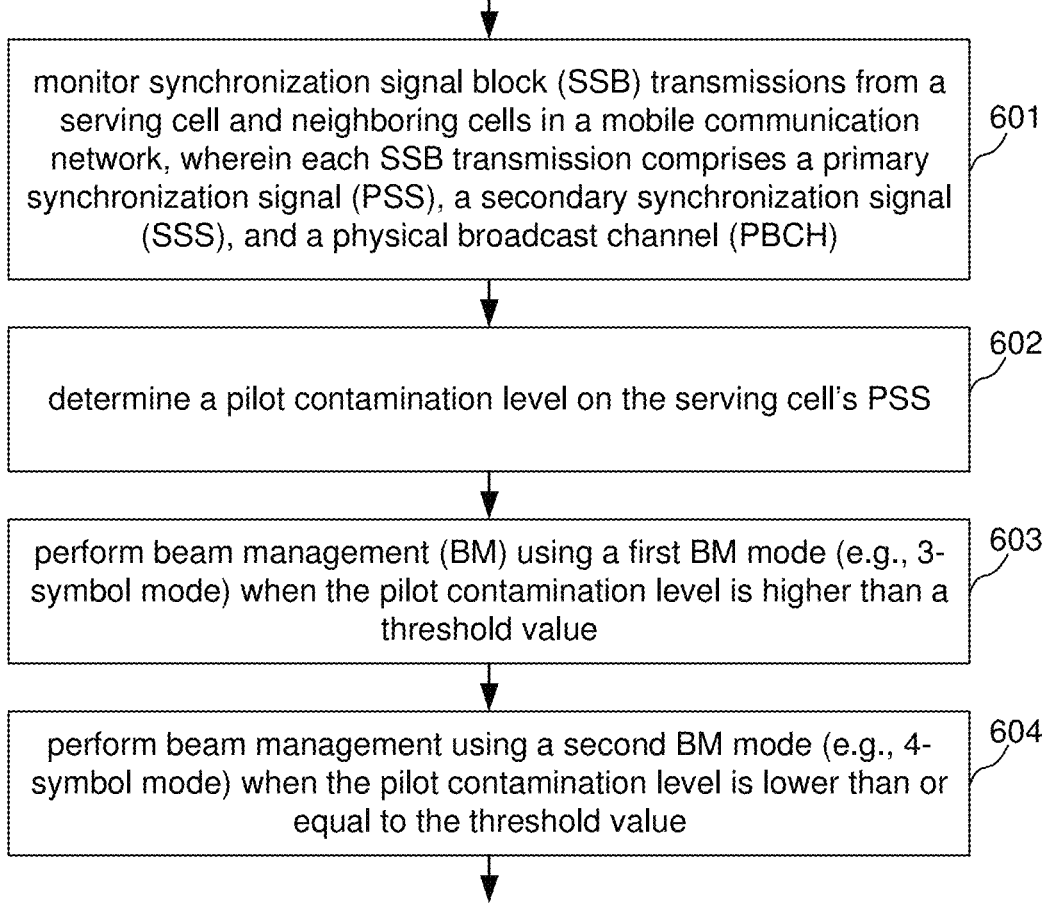

monitor synchronization signal block (SSB) transmissions from a serving cell and neighboring cells in a mobile communication network, wherein each SSB transmission comprises a primary synchronization signal (PSS), a secondary synchronization signal (SSS), and a physical broadcast channel (PBCH)          601 determine a pilot contamination level on the serving cell's PSS          602 perform beam management (BM) using a first BM mode (e.g., 3-symbol mode) when the pilot contamination level is higher than a threshold value          603 perform beam management using a second BM mode (e.g., 4-symbol mode) when the pilot contamination level is lower than or equal to the threshold value          604

FIG. 6

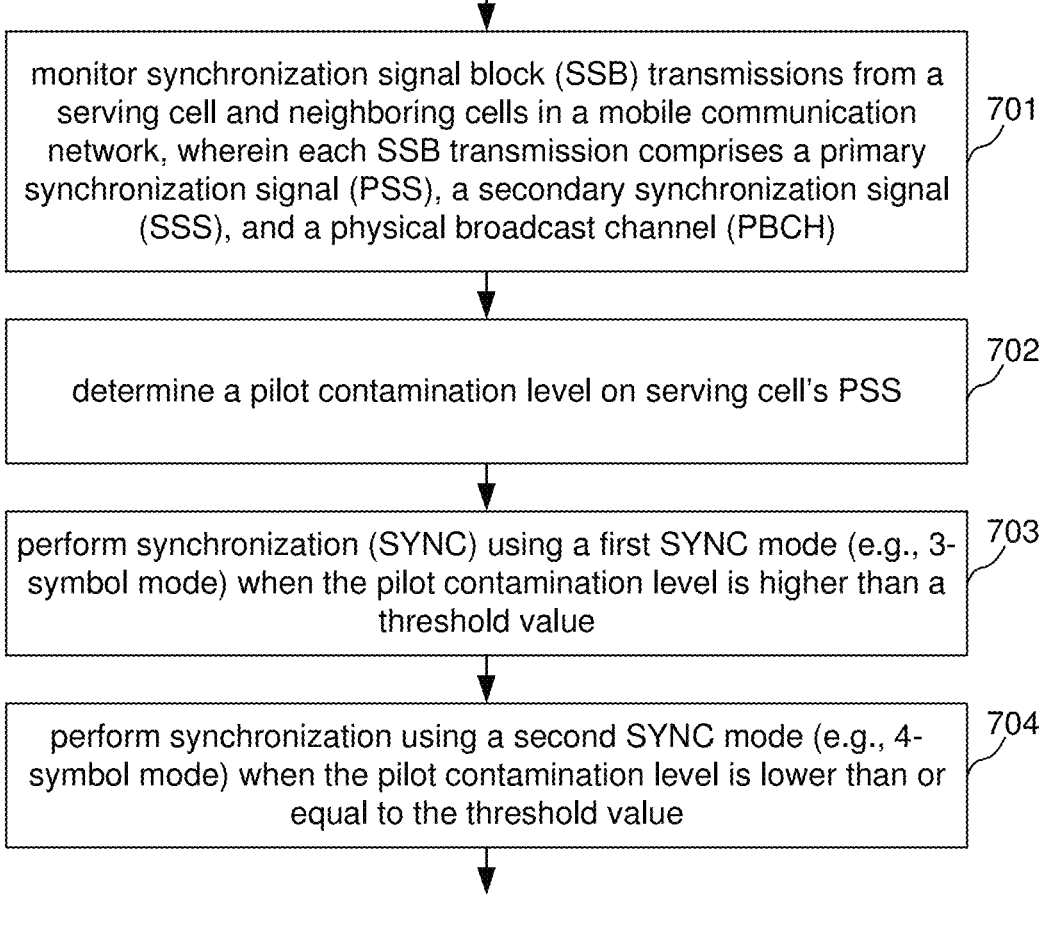

monitor synchronization signal block (SSB) transmissions from a serving cell and neighboring cells in a mobile communication network, wherein each SSB transmission comprises a primary synchronization signal (PSS), a secondary synchronization signal (SSS), and a physical broadcast channel (PBCH) 701 determine a pilot contamination level on serving cell's PSS 702 perform synchronization (SYNC) using a first SYNC mode (e.g., 3-symbol mode) when the pilot contamination level is higher than a threshold value 703 perform synchronization using a second SYNC mode (e.g., 4-symbol mode) when the pilot contamination level is lower than or equal to the threshold value 704

FIG. 7

ADAPTIVE BEAM MANAGEMENT APPROACH FOR NEW RADIO SYSTEMS

CROSS REFERENCE TO RELATED APPLICATIONS

This application claims priority under 35 U.S.C. § 119 from U.S. Provisional Application No. 63/296,892, entitled "Adaptive Beam Management Approach for New Radio Systems", filed on Jan. 6, 2022, the subject matter of which is incorporated herein by reference.

TECHNICAL FIELD

The disclosed embodiments relate generally to wireless communication, and, more particularly, to a method for adaptive beam management and synchronization in 5G New Radio (NR) cellular communication networks.

BACKGROUND

The wireless communications network has grown exponentially over the years. A long-term evolution (LTE) system offers high peak data rates, low latency, improved system capacity, and low operating cost resulting from simplified network architecture. LTE systems, also known as the 4G system, also provide seamless integration to older wireless network, such as GSM, CDMA and universal mobile tele-communication system (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The next generation mobile network (NGMN) board has decided to focus the future NGMN activities on defining the end-to-end requirements for 5G new radio (NR) systems. In 5G NR, the base stations are also referred to as gNodeBs or gNBs.

Frequency bands for 5G NR are being separated into two different frequency ranges. Frequency Range 1 (FR1) includes sub-6 GHz frequency bands, some of which are bands traditionally used by previous standards, but has been extended to cover potential new spectrum offerings from 410 MHz to 7125 MHz. Frequency Range 2 (FR2) includes frequency bands from 24.25 GHz to 71.0 GHz. Bands in FR2 in this millimeter wave (mmWave) range have shorter propagation range but higher available bandwidth than bands in FR1. To compensate for high propagation loss in 5G mmWave systems, a NB is usually equipped with multi antennas to enable beamforming. For downlink data reception, beam management (BM), synchronization (both time and frequency), and accurate layer 1 (L1) measurements of reference signals are required at a UE.

As in LIE, the primary synchronization signal (PSS) and the secondary synchronization signal (SSS) in 5G NR represent the physical cell identity (PCI), and the Physical broadcast channel (PBCH) carries the master information block (MIB). The SS Block (SSB) in 5G NR stands for Synchronization Signal Block and it refers to synchronization signal (PSS/SSS) and PBCH block because the synchronization signal and PBCH channel are packed as a single block. The SSB is transmitted periodically and each SSB burst comprises PSS/SSS and PBCH. Specifically, SSB with four OFDM symbols (PSS, PBCH0, SSS, PPCH2) is a good reference signal to perform beam management (BM) and synchronization (Sync) at a UE. In a conventional SSB based BM and Sync, a UP only utilizes PBCH0, SSS and PBCH2, because PSS may suffer from pilot contamination. Using PSS (when its pilot contamination is low) as one extra symbol for BM and Sync at a UE can improve the system performance. A solution is sought.

SUMMARY

A method to perform beam management (BM) and/or synchronization (Sync) using primary synchronization signal (PSS) when its pilot contamination is low to improve system performance is proposed. A UP first determines pilot contamination level on PSS of a synchronization signal block (SSB), depending on different network deployment scenarios. The UP then adaptively performs BM or Sync, by dynamically adjusting to the pilot contamination level on PSS. If the pilot contamination level is high, then the UP follows a 3-symbol mode, e.g., uses only PBCH0, SSS, and PBCH2 symbols for performing BM or Sync. Otherwise, if the pilot contamination level is low, then the UE follows a 4-symbol mode, e.g., uses PSS as an extra symbol for BM or Sync to improve system performance.

In one embodiment, a UE monitors synchronization signal block (SSB) transmissions from a serving cell and neighboring cells in a mobile communication network, wherein each SSB transmission comprises a primary synchronization signal (PSS), a secondary synchronization signal (SSS), and a physical broadcast channel (PBCH). The UE determines a pilot contamination level on serving cell's PSS. The UE performs beam management (BM) using a first BM mode when the pilot contamination level is higher than a threshold value. The UE performs beam management using a second BM mode when the pilot contamination level is lower than or equal to the threshold value.

In another embodiment, a UE monitors synchronization signal block (SSB) transmissions from a serving cell and neighboring cells in a mobile communication network, wherein each SSB transmission comprises a primary synchronization signal (PSS), a secondary synchronization signal (SSS), and a physical broadcast channel (PBCH). The UE determines a pilot contamination level on serving cell's PSS. The UE performs synchronization (SYNC) using a first SYNC mode when the pilot contamination level is higher than a threshold value. The UE performs synchronization using a second SYNC mode when the pilot contamination level is lower than or equal to the threshold value.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 6 is a flow chart of a method of performing beam management (BM) using PSS when pilot contamination on PSS is low in accordance with one novel aspect.

FIG. 7 is a flow chart of a method of performing synchronization (Sync) using PSS when pilot contamination on PSS is low in accordance with one novel aspect.

DETAILED DESCRIPTION

Reference will now be made in detail to some embodiments of the invention, examples of which are illustrated in the accompanying drawings.

Figure 1:
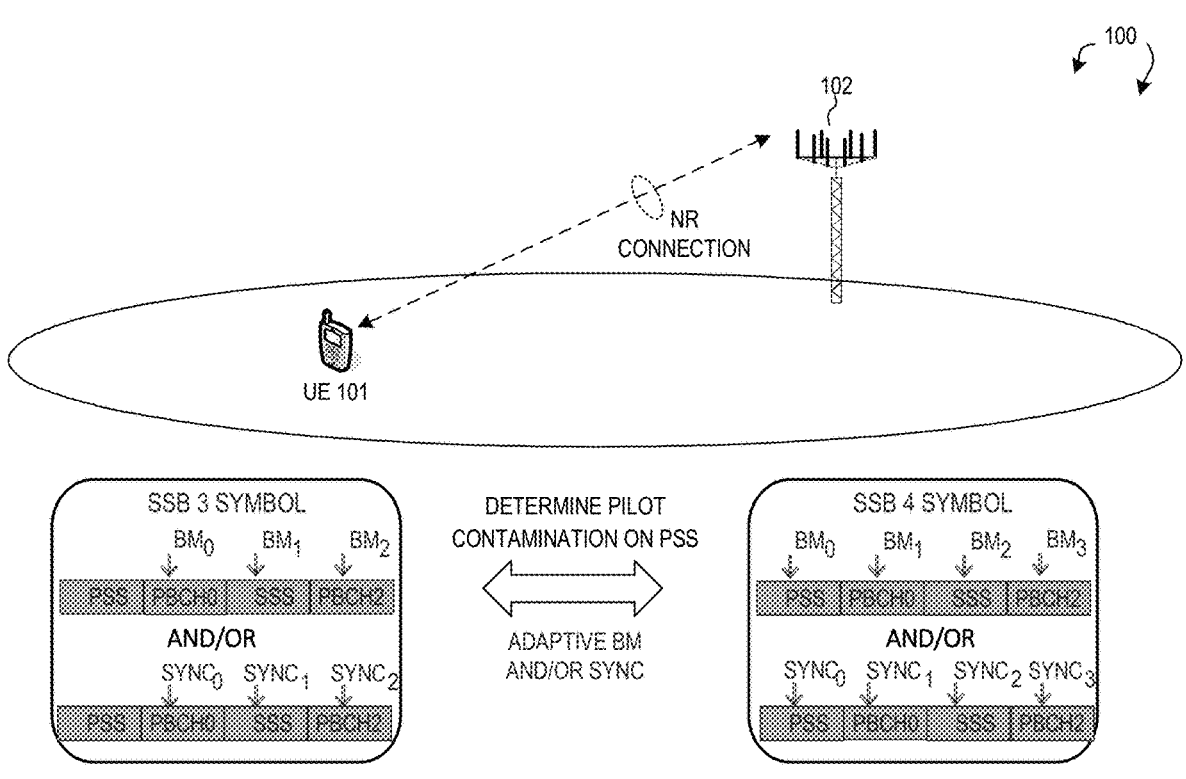
FIG. 1 illustrates an exemplary 5G New Radio (NR) network supporting beam management and synchronization using synchronization signal block (SSB) in accordance with aspects of the current invention.

FIG. 1 illustrates an exemplary 5G New Radio (NR) network 100 supporting beam management and synchronization using synchronization signal block (SSB) in accordance with aspects of the current invention. The 5G NR network 100 comprises a User Equipment (UE) 101 and a plurality of base stations including a serving base station gNB 102. UE 101 is communicatively connected to the serving gNB 102, which provides radio access using a Radio Access Technology (RAT) (e.g., the 5G NR technology). The UE 101 may be a smart phone, a wearable device, an Internet of Things (IoT) device, and a tablet, etc. Alternatively, UE 101 may be a Notebook (NB) or Personal Computer (PC) inserted or installed with a data card which includes a modem and RF transceiver(s) to provide the functionality of wireless communication. To compensate for high propagation loss in 5G mmWave systems, a UE is usually equipped with multiple antennas to enable beamforming. For downlink (DL) data reception, beam management (BM), synchronization (Sync), and accurate L1 measurements of reference signals are required at a UE.

As in LTE, the primary synchronization signal (PSS) and the secondary synchronization signal (SSS) in 5G NR represent the physical cell identity (PCI), and the Physical broadcast channel (PBCH) carries the master Information block (MIB). The SS Block (SSB) in 5G NR stands for Synchronization Signal Block and it refers to synchronization signal (PSs/SSS) and PBCH block because the synchronization signal and PBCH channel are packed as a single block. The SSB is transmitted periodically and each SSB burst comprises PSS/SSS and PBCH. Specifically, SSB with four OFDM symbols (PSS, PBCH0, SSS, PBCH2) is a good reference signal for NE to perform BM and Sync. In a conventional SSB based BM and Sync, a UE only utilizes PBCH0, SSS and PBCH2 to perform BM or Sync (as depicted by 110), because PSS may suffer from pilot contamination. Using PSS (when its pilot contamination is low) as one extra symbol for BM or Sync (as depicted by 120) can Improve the system performance.

In accordance with one novel aspect, to improve system performance, a method is proposed to perform beam management (BM) and synchronization (Sync) using primary synchronization signal (PSI) when pilot contamination is low. In the example of FIG. 1, UE 101 first determines pilot contamination level on PSS, depending on different network deployment scenarios. UE 101 can then adaptively perform BM or Sync, by dynamically adjusting to the pilot contamination level on PSS. If the pilot contamination level is high, then UE 101 follows the 3-symbol mode, e.g., uses only PBCH0, SSS, and PBCH2 symbols for performing BM or Sync. Otherwise, if the pilot contamination level is low, then UE 101 follows the 4-symbol mode, e.g., uses PSS as an extra symbol for BM or Sync to improve system performance.

Figure 2:
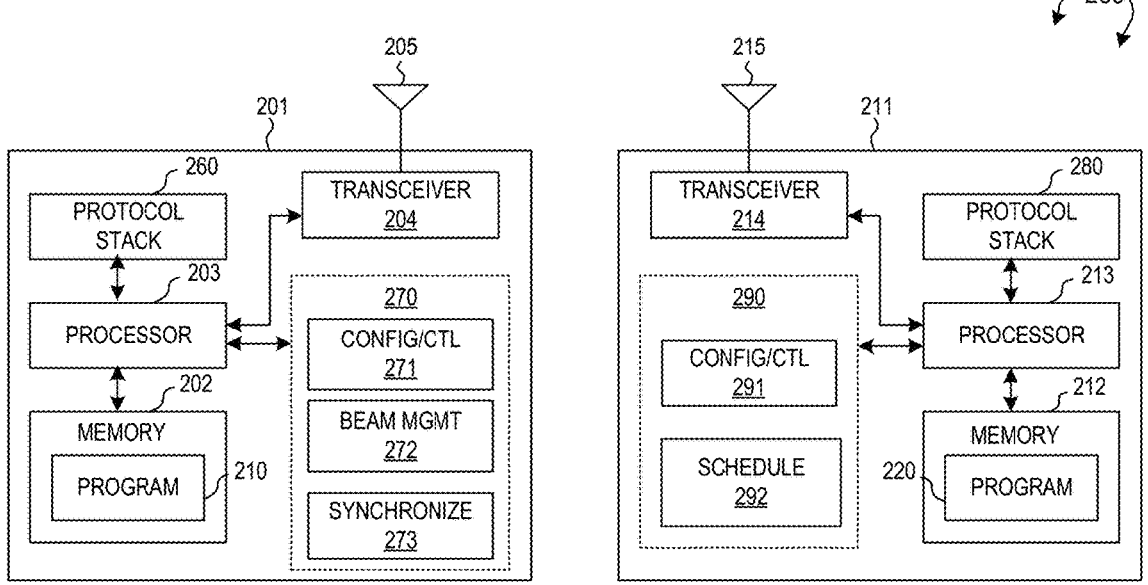
FIG. 2 illustrates simplified block diagrams of wireless devices, e.g., a UE and a gNB in accordance with embodiments of the current invention.

FIG. 2 illustrates simplified block diagrams of wireless devices, e.g., a UE 201 and a gNB 211 in accordance with embodiments of the current invention in 5G NR network 200. The gNB 211 has an antenna 215, which transmits and receives radio signals. An RF transceiver module 214, coupled with the antenna 215, receives RF signals from the antenna 215, converts them to baseband signals and sends them to the processor 213. The RF transceiver 214 also converts received baseband signals from the processor 213, converts them to RF signals, and sends out to the antenna 215. The processor 213 processes the received baseband signals and invokes different functional modules to perform features in the gNB 211. The memory 212 stores program instructions and data 220 to control the operations of the gNB 211. In the example of FIG. 2, the gNB 211 also includes a protocol stack 280 and a set of control function modules and circuits 290. The protocol stack 280 may include a Non-Access-Stratum (NAS) layer to communicate with an AMF/SMF/MME entity connecting to the core network, a Radio Resource Control (RRC) layer for high layer configuration and control, a Packet Data Convergence Protocol/Radio Link Control (PDCP/RLC) layer, a Media Access Control (MAC) layer, and a Physical (PHY) layer. In one example, the control function modules and circuits 290 include a configuration circuit for configuring measurements report and active set for UE, and a handover handling circuit for sending cell-switch to the UE upon handover decision.

Similarly, the UE 201 has a memory 202, a processor 203, and an RF transceiver module 204. The RF transceiver 204 is coupled with the antenna 205, receives RF signals from the antenna 205, converts them to baseband signals, and sends them to the processor 203. The RF transceiver 204 also converts received baseband signals from the processor 203, converts them to RF signals, and sends out to the antenna 205. The processor 203 processes the received baseband signals and invokes different functional modules and circuits to perform features in the UE 201. The memory 202 stores data and program instructions 210 to be executed by the processor 203 to control the operations of the UE 201. Suitable processors include, by way of example, a special purpose processor, a Digital Signal Processor (DSP), a plurality of micro-processors, one or more micro-processor associated with a DSP core, a controller, a microcontroller, Application Specific Integrated Circuits (ASICs), File Programmable Gate Array (FPGA) circuits, and other type of Integrated Circuits (ICs), and/or state machines. A processor in associated with software may be used to implement and configure features of the UE 201.

The UE 201 also includes a protocol stack 260 and a set of control function modules and circuits 270. The protocol stack 260 may include a NAS layer to communicate with an AMF/SMF/MME entity connecting to the core network, an RRC layer for high layer configuration and control, a PDCP/RLC layer, a MAC layer, and a PHY layer. The Control function modules and circuits 270 may be implemented and configured by software, firmware, hardware, and/or combination thereof. The control function modules and circuits 270, when executed by the processor 203 via program instructions contained in the memory 202, interwork with each other to allow the UE 201 to perform embodiments and functional tasks and features in the network. In one example, the control function modules and circuits 270 include a configuration and control circuit 271 for obtaining measurements and configuration information and controlling corresponding operation, a beam management circuit 272 for performing DL and UL beam management, and a synchronization handling circuit 273 for performing synchronization functionalities based on the configuration received from the network.

Figure 3:
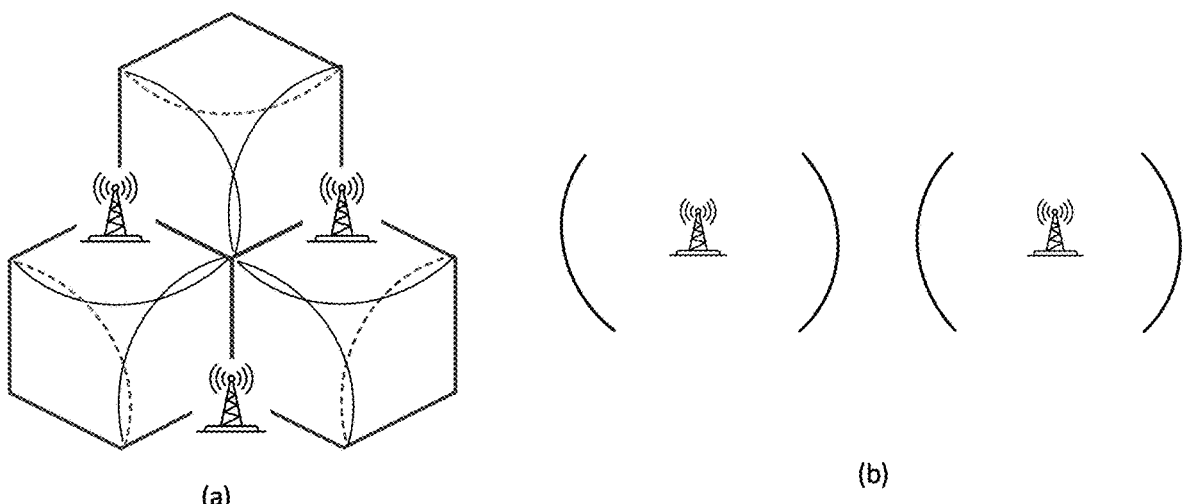
FIG. 3 illustrates SSB generation and correlation on SSB in different network deployments.

FIG. 3 illustrates SSB generation and correlation on SSBs from different cells under various network deployment scenarios. The Synchronization Signal/PBCH block (SSB) consists of PSS, SSS and PBCH. Synchronization signals can also be used by the UE for RSRP/RSPQ and SNR L1 measurements. In addition, beam management CM procedure is used in 5G NR in order to acquire d maintain a set of beams to ensure that gNB and UE beams are aligned for data communication. Specifically, SSB is packed with four OFDM symbols (PSS, PBCH0, SSS, PBCH2) for UE to perform BM and Sync using all or part of the symbols. Each base station and serving/neighboring cell generate its own SSE, based on physical cell ID ($N_{ID}^{CELL}$), and the SSB index (SBI). There may be correlations between the SSBs transmitted from the serving base station and neighboring base stations in serving cell and neighboring cells. Depending on network deployment, the correlations are also different.

For PSS generation, the value of PSS depends on the sector cell ID $$N_{ID}^{(2)} \in \{0, 1, 2\},$$

and therefore PSS only has three sequences to choose from; For SSS generation, the sequence of SSS depends on the composite cell ID $$N_{ID}^{(1)} \in \{0, 1, \dots, 335\} \ (N_{ID}^{cell} = 3N_{ID}^{(1)} + N_{ID}^{(2)}),$$

and therefore SSS has 336 sequences to choose from; For PBCH generation, the sequence for PBCH-DMRS depends on SSB index and Physical cell ID, where SSB index determines its scrambling sequency, Physical cell ID determines its frequency location. As depicted in FIG. 3, the pilot contamination level on PSS thus depends on network deployment scenarios. In the example of a denser network deployment, as depicted in FIG. 3(*a*), it is likely that the neighboring cell may use the same PSS as the serving cell. Therefore, PSS of the serving cell may suffer from pilot contamination. As a comparison, in the example of a sparser deployment, as depicted in FIG. 3(*b*), the neighboring cell and serving cell are likely to use different PSS. When PSS of serving cell is contaminated by neighbor cells, it is not reliable to use PSS for BM and Sync. In contrast, if PSS of the serving cell is free from pilot contamination, it can be used as an extra symbol for BM and Sync to improve performance, e.g., to improve robustness in BM and accuracy in Sync.

Figure 4:
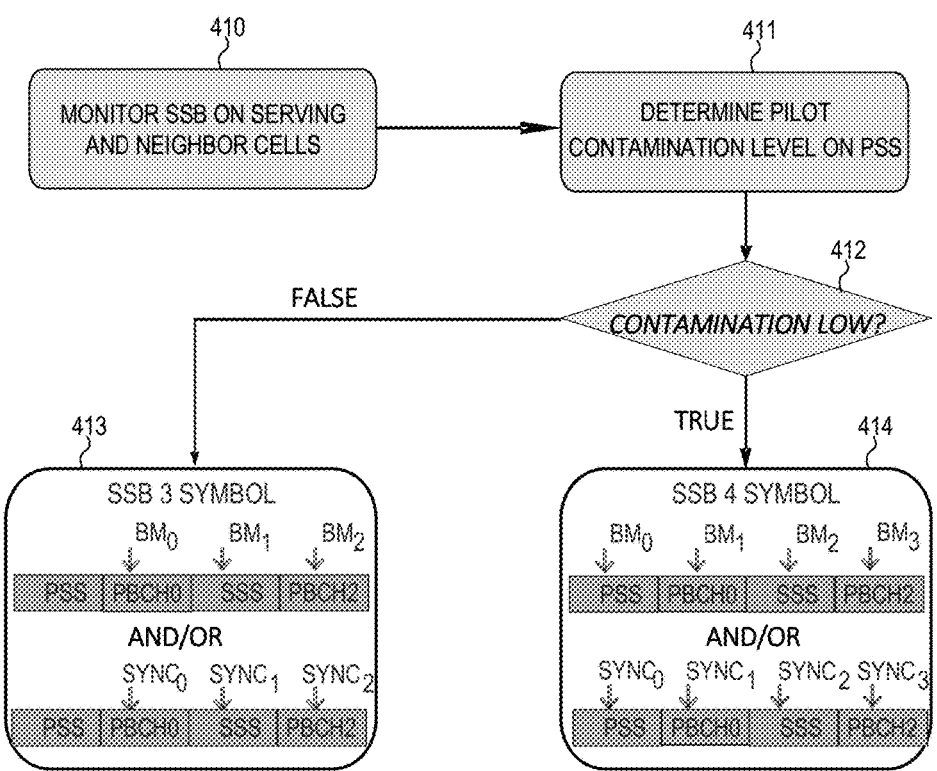
FIG. 4 illustrates an embodiment of performing SSB-based beam management and synchronization based on pilot contamination level on PSS, where each SSB transmission has four OFDM symbols (PSS, PBCH0, SSS, PBCH2).

FIG. 4 illustrates an embodiment of performing SSB-based beam management and synchronization based on pilot contamination level on PSS, where each SSB transmission has four OFDM symbols (PSS, PBCH0, SSS, PBCH2). In step 410, a UE monitors SSB transmission from the serving cell and neighbor cells. In step 411, the UE determines pilot contamination on PSS from neighbor cells. In step 412, the UE checks whether the contamination on PSS is lower than a predefined threshold. If the answer is FALSE, then the UE goes to step 413, and performs beam management and/or synchronization by using PBCH0, SSS, and PSCH2 three symbols, to avoid potential pilot contamination on PSS. If the answer is TRUE, then the UE goes to step 414, and performs beam management and/or synchronization by using PSS, PBCH0, SSS, and PBCH2 all four symbols, to improve system performance. As a result, adaptive BM and Sync can be achieved by first detecting pilot contamination on PSS and then perform 3-Symbol based BM/Sync (to avoid PSS contamination), or 4-Symbol based BM/Sync (to achieve better channel measurements and estimation) dynamically adapting to network environment.

Figure 5:
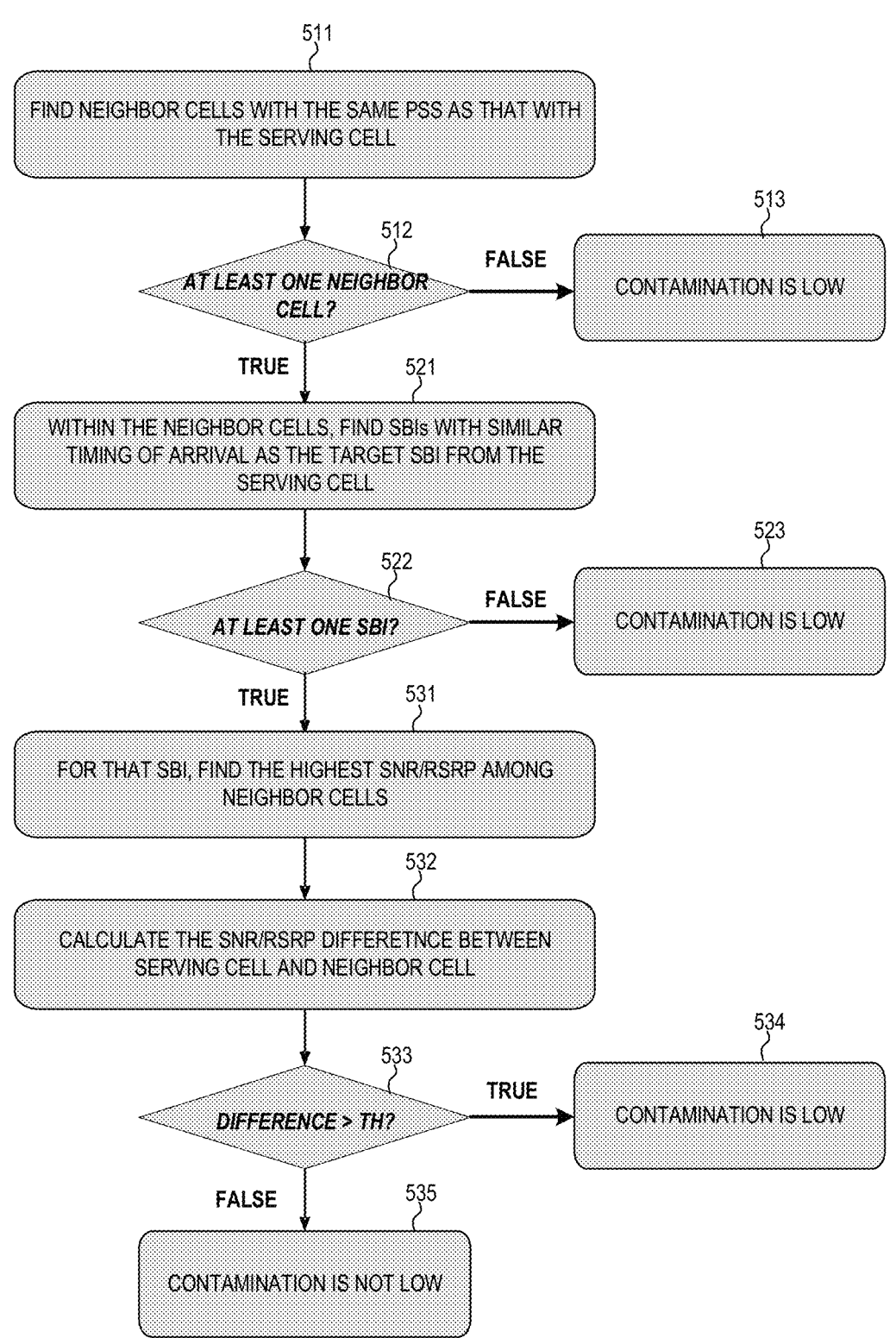
FIG. 5 illustrates an embodiment of determining pilot contamination level on PSS.

FIG. 5 illustrates an embodiment of determining pilot contamination level on PSS. A UE first monitors SSB transmission from the serving cell and neighboring cells. The UE then decodes cell ID and SBI from the received SSBs of the serving cell and neighboring cells. In step 511, UE finds neighbor cells having the same PSS as the PSS of the serving cell. In step 512, UE checks whether there are at least one neighbor cell having the same PSS as the serving cell. If the answer is false (no neighbor cell having the same PSS), then in 513, UE reaches a conclusion that the pilot contamination on PSS is low. If the answer is true, then UE continues with step 521.

In step 521, within the neighbor cells having the same PSS, UE finds SBIs with similar timing of arrival (e.g., within CP length) as the target SBI from the serving cell. In step 522, UE checks whether at least one SBI is found. If the answer is false (no neighbor cell has SBI with similar timing of arrival as the target SBI of the serving cell), then in step 523, UE reaches a conclusion that the pilot contamination on PSS is low. If the answer is true, UE continues with step 531.

In step 531, for that SBI, UE finds the highest signal strength/quality (SNR/RSRP) among the neighbor cells, represented as $SNR_{NC}$ and $RSRP_{NC}$. In step 532, UE calculates the SNR/RSRP difference between the serving cell and the neighbor cell, represented as $(SNR_{SC}-SNR_{NC})$ and $(RSRP_{SC}-RSRP_{NC})$. In step 533, UE determines whether the signal strength/quality difference between the serving cell and the neighbor cell is larger than a predefined threshold value, e.g., UE determines whether $(SNR_{SC}-SNR_{NC})$ >TH and $(RSRP_{SC}-RSRP_{NC})$>TH. If the answer is true, then UE concludes that the contamination on PSS is low (step 534). Otherwise, the UE determines that the contamination on PSS is not low (step 535).

FIG. 6 is a flow chart of a method of performing beam management (BM) using PSS when pilot contamination is low in accordance with one novel aspect. In step 601, a UE monitors synchronization signal block (SSB) transmissions from a serving cell and neighboring cells in a mobile communication network, wherein each SSB transmission comprises a primary synchronization signal (PSS), a secondary synchronization signal (SSS), and a physical broadcast channel (PBCH). In step 602, the UE determines a pilot contamination level on the serving cell's PSS. In step 603, the UE performs beam management (BM) using a first BM mode (e.g., a 3-symbol BM mode) when the pilot contamination level is higher than a threshold value. In step 604, the UE performs beam management using a second BM mode (e.g., a 4-symbol BM mode) when the pilot contamination level is lower than or equal to the threshold value.

FIG. 7 is a flow chart of a method of performing synchronization (Sync) using PSS when pilot contamination is low in accordance with one novel aspect. In step 701, a UE monitors synchronization signal block (SSB) transmissions from a serving cell and neighboring cells in a mobile communication network, wherein each SSB transmission comprises a primary synchronization signal (PSS), a secondary synchronization signal (SSS), and a physical broadcast channel (PBCH). In step 702, the UE determines a pilot contamination level on the serving cell's PSS. In step 703, the UE performs synchronization (SYNC) using a first SYNC mode (e.g., a 3-symbol SYNC mode) when the pilot contamination level is higher than a threshold value. In step 704, the UE performs synchronization using a second SYNC mode (e.g., a 4-symbol SYNC mode) when the pilot contamination level is lower than or equal to the threshold value.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:

monitoring synchronization signal block (SSB) transmissions from a serving cell and neighboring cells by a User Equipment (UE) in a mobile communication network, wherein each SSB transmission comprises a primary synchronization signal (PSS), a secondary synchronization signal (SSS), and a physical broadcast channel (PBCH);

determining a pilot contamination level on PSS from the neighboring cells;

performing beam management (BM) using a first BM mode when the pilot contamination level is higher than a threshold value; and performing beam management using a second BM mode when the pilot contamination level is lower than or equal to the threshold value, wherein the PSS, SSS, and PBCH are allocated in consecutive OFDM symbols within each SSB transmission in time domain, and wherein the second BM mode involves using the PSS, SSS, and PBCH symbols for the beam management.

2. The method of claim 1, wherein the first BM mode involves using only the SSS and the PBCH symbols for the beam management.

3. The method of claim 1, wherein the UE performs synchronization without using the PSS symbol when the pilot contamination level is higher than the threshold value, and performs synchronization using the PSS symbol when the pilot contamination level is lower than or equal to the threshold value.

4. The method of claim 1, wherein the determining of the pilot contamination involves finding a neighboring cell having the same PSS as the serving cell.

5. The method of claim 1, wherein the determining of the pilot contamination involves finding a timing of arrival of an SSB of a neighbor cell that is within a time window from a timing of arrival of a target SSB of the serving cell.

6. The method of claim 1, wherein the determining of the pilot contamination involves finding a signal quality difference of SSB transmissions between the serving cell and a neighbor cell.

7. A method, comprising:

monitoring synchronization signal block (SSB) transmissions from a serving cell and neighboring cells by a User Equipment (UE) in a mobile communication network, wherein each SSB transmission comprises a primary synchronization signal (PSS), a secondary synchronization signal (SSS), and a physical broadcast channel (PBCH);

determining a pilot contamination level on PSS from the neighboring cells;

performing synchronization (SYNC) using a first SYNC mode when the pilot contamination level is higher than a threshold value; and performing synchronization using a second SYNC mode when the pilot contamination level is lower than or equal to the threshold value, wherein the PSS, SSS, and PBCH are allocated in consecutive OFDM symbols within each SSB transmission in time domain, and wherein the second SYNC mode involves using the PSS, SSS, and PBCH symbols for the synchronization.

8. The method of claim 7, wherein the first SYNC mode involves using only the SSS and the PBCH symbols for the synchronization.

9. The method of claim 7, wherein the UE performs beam management without using the PSS symbol when the pilot contamination level is higher than the threshold value, and performs management using the PSS symbol when the pilot contamination level is lower than or equal to the threshold value.

10. The method of claim 7, wherein the determining of the pilot contamination involves finding a neighboring cell having the same PSS as the serving cell.

11. The method of claim 7, wherein the determining of the pilot contamination involves finding a timing of arrival of an SSB of a neighbor cell that is within a time window from a timing of arrival of a target SSB of the serving cell.

12. The method of claim 7, wherein the determining of the pilot contamination involves finding a signal quality difference of SSB transmissions between the serving cell and a neighbor cell.

13. A User Equipment (UE), comprising:

a receiver that receives synchronization signal block (SSB) transmissions from a serving cell and neighboring cells in a mobile communication network, wherein each SSB transmission comprises a primary synchronization signal (PSS), a secondary synchronization signal (SSS), and a physical broadcast channel (PBCH);

a controller that determining a pilot contamination level on PSS from the neighboring cells; and a beam management (BM) handling circuit that performs beam management using a first BM mode when the pilot contamination level is higher than a threshold value, and performs beam management using a second BM mode when the pilot contamination level is lower than or equal to the threshold value, wherein the PSS, SSS, and PBCH are allocated in consecutive OFDM symbols within each SSB transmission in time domain, and wherein the second BM mode involves using the PSS, SSS, and PBCH symbols for the beam management.

14. The UE of claim 13, wherein the first BM mode involves using only the SSS and the PBCH symbols for the beam management.

15. The UE of claim 13, wherein the UE performs synchronization without using the PSS symbol when the pilot contamination level is higher than the threshold value, and performs synchronization using the PSS symbol when the pilot contamination level is lower than or equal to the threshold value.

16. The method of claim 13, wherein the determining of the pilot contamination involves finding a neighboring cell having the same PSS as the serving cell.

17. The method of claim 13, wherein the determining of the pilot contamination involves finding a timing of arrival of an SSB of a neighbor cell that is within a time window from a timing of arrival of a target SSB of the serving cell.

18. The method of claim 13, wherein the determining of the pilot contamination involves finding a signal quality difference of SSB transmissions between the serving cell and a neighbor cell.

19. A User Equipment (UE), comprising:

a receiver that receives synchronization signal block (SSB) transmissions from a serving cell and neighboring cells in a mobile communication network, wherein each SSB transmission comprises a primary synchronization signal (PSS), a secondary synchronization signal (SSS), and a physical broadcast channel (PBCH);

a controller that determining a pilot contamination level on a received PSS of the serving cell; and a synchronization (SYNC) handling circuit that performs synchronization using a first SYNC mode when the pilot contamination level is higher than a threshold value, and performs synchronization using a second SYNC mode when the pilot contamination level is lower than or equal to the threshold value, wherein the PSS, SSS, and PBCH are allocated in consecutive OFDM symbols within each SSB transmission in time domain; and wherein the second SYNC mode involves using the PSS, SSS, and PBCH symbols for the synchronization.

20. The UE of claim 19, wherein the first SYNC mode involves using only the SSS and the PBCH symbols for the synchronization.

21. The UE of claim 19, wherein the UE performs beam management without using the PSS symbol when the pilot contamination level is higher than the threshold value, and performs beam management using the PSS symbol when the pilot contamination level is lower than or equal to the threshold value.

22. The method of claim 19, wherein the determining of the pilot contamination involves finding a neighboring cell having the same PSS as the serving cell.

23. The method of claim 19, wherein the determining of the pilot contamination involves finding a timing of arrival of an SSB of a neighbor cell that is within a time window from a timing of arrival of a target SSB of the serving cell.

24. The method of claim 19, wherein the determining of the pilot contamination involves finding a signal quality difference of SSB transmissions between the serving cell and a neighbor cell.

\*　\*　\*　\*　\*